May 26, 1964    J. H. STEVENS    3,134,374
OIL AND WATER PREHEATER FOR INTERNAL COMBUSTION ENGINES
Filed Aug. 26, 1963    2 Sheets-Sheet 1

James H. Stevens
INVENTOR.

BY *Clarence A. O'Brien*
*and Harvey B. Jacobson*
Attorneys

May 26, 1964     J. H. STEVENS     3,134,374
OIL AND WATER PREHEATER FOR INTERNAL COMBUSTION ENGINES
Filed Aug. 26, 1963     2 Sheets-Sheet 2

James H. Stevens
INVENTOR.

United States Patent Office 3,134,374
Patented May 26, 1964

3,134,374
OIL AND WATER PREHEATER FOR INTERNAL
COMBUSTION ENGINES
James H. Stevens, Box 396, Morehead, Ky.
Filed Aug. 26, 1963, Ser. No. 304,379
8 Claims. (Cl. 123—142.5)

This invention comprises a novel and useful oil and water preheater for internal combustion engines and more particularly pertains to a device which is adapted to be readily applied to any conventional internal combustion engine and will function to preheat vital circulating systems thereof such as the lubricating and cooling systems thereof to facilitate starting of the engine in cold weather, bringing the engine to economical running temperature as rapidly as possible and reducing wear upon the engine during its warming up period.

A further and more specific object of the invention is to provide a preheater assembly which may be readily attached to an engine and intermittently connected to the lubricating and cooling systems thereof whereby the latter may be preheated and circulated through the engine prior to operation of the engine.

Yet another purpose of the invention is to provide a device in accordance with the foregoing objects which shall use an external source of energy to effect the preheating operation and the circulating of the liquid systems of the engine during the preheating period thereof.

An additional object of the invention is to provide a device in accordance with the foregoing object wherein all of the operating components thereof may be compactly housed in a single casing or housing which may be connected to the side of an internal combustion engine in any suitable manner and with passage means connecting the preheating elements with the liquid circulating systems of the engine.

Still another purpose of the invention is to provide a device in accordance with the foregoing objects wherein separate oil and water preheating units are each connected to the liquid circulating system of the engine and which preheater units include a circulating pump for each together with a common driving means for operating both of such pumps.

A still further object of the invention is to provide a device in accordance with the foregoing objects which shall effect and improve heat exchange relation between a single electrically operated preheater and a pair of preheating coils one of which is connected to the lubricating system and the other of which is connected to the cooling system of the engine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
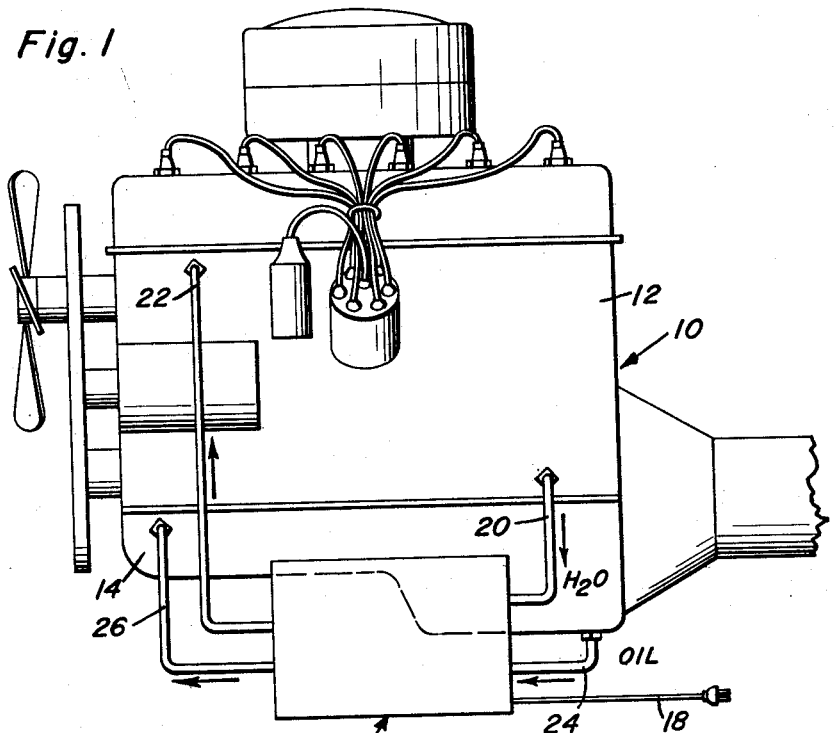
FIGURE 1 is a side elevational view of a conventional internal combustion engine showing the oil and water preheater of this invention applied thereof.

In the accompanying drawings, the numeral 10 designates generally an internal combustion engine of any conventional type, the engine block 12 including water jacketing forming part of the circulating water cooling system of the engine while a sump or crankcase housing 14 secured to the bottom of the engine block forms a part of the circulating lubricant system of the engine. Inasmuch as the cooling and lubricating systems are of any conventional design and in themselves do not constitute a limitation upon the principles of this invention, and are well understood by those skilled in the art, a further discussion thereof is deemed to be unnecessary.

The preheating assembly of this invention comprises a preheater device indicated generally by the numeral 16 which is mounted upon the side of the engine block in any suitable manner, not shown, and preferably adjacent to or upon the crankcase 14 thereof. This assembly 16 is connected by suitable conduits or passage means to the associated portions of the engine lubricating and cooling systems and by means of an electric cable 18 to any suitable source of electric power such as a conventional 110 volt, 220 volt electric power source.

Figure 2:
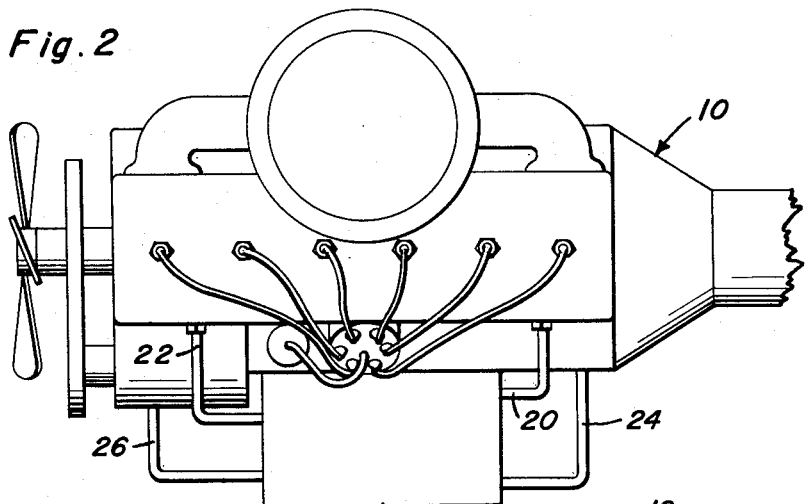
FIGURE 2 is a top plan view of the arrangement of FIGURE 1.

With continuing reference to FIGURES 1 and 2 it will be observed that two sets of conduits or pipes are provided by which the preheating assembly is operatively connected to the engine lubricating-cooling systems. Thus, there is provided an intake pipe 20 which connects with the lower portion of the engine water cooling system in any suitable manner while a return pipe 22 connects with an elevated portion of the cooling system. Insofar as this invention is concerned, it is immaterial whether these connections are to water hose connections, to the water jacket or to any other portion of the circulating water cooling system of the engine.

The assembly further includes a lubricant intake pipe 24 which is connected to the lower portion of the engine crankcase and a lubricant return pipe 26 which is connected to an upper portion of the crankcase. Here also, the precise location of the connections of these pipes to the lubricating system is immaterial insofar as the purpose of this invention is concerned. It will thus be understood that the illustrated connections of FIGURES 1 and 2 are to be considered as exemplary only of one suitable manner for successfully practicing the principles of the invention.

Figure 3:
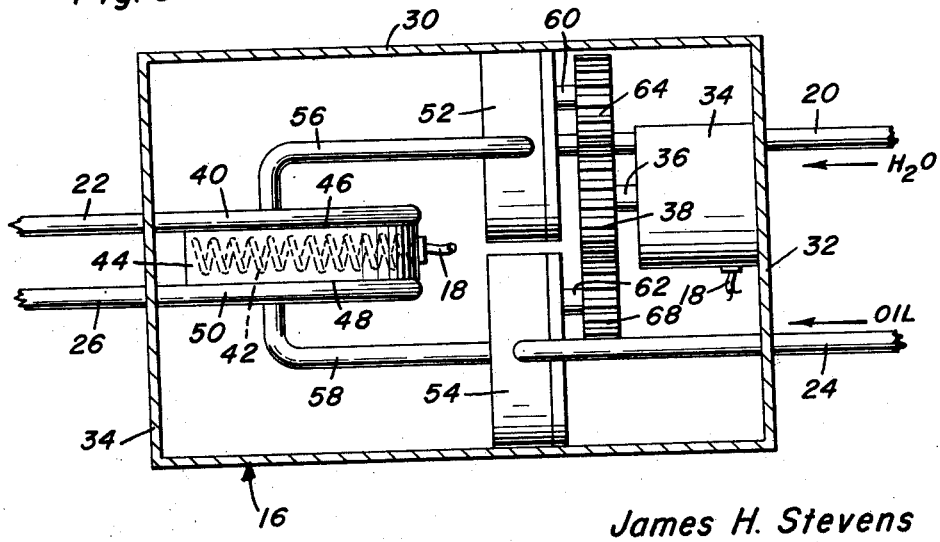
FIGURE 3 is a view in vertical longitudinal section through the preheater housing of FIGURE 1.
Figure 4:
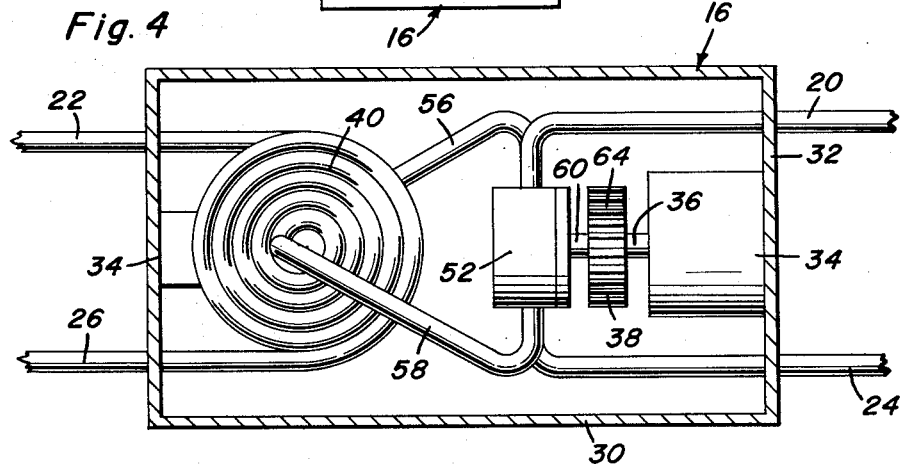
FIGURE 4 is a view in vertical horizontal section through the preheater housing.

Referring now particularly to FIGURES 3 and 4 it will be seen that the assembly 16 includes a housing or casing 30 which is elongated longitudinally and may conveniently consist of a cylindrical housing having a pair of opposite end walls as at 32 and 34. The two inlet pipes 20 and 24 extend through one end wall 32 in a sealed relation thereto in any suitable manner, while the outlet pipes 22 and 26 extend through the other end wall 34 in a similar fashion.

Disposed in one end of the casing is a source of power such as an electric motor 34 which is connected to the cable 18 previously mentioned and thus to any desired outside source of power. The motor includes a driving shaft 36 having a driving gear 38 secured thereto. At the other end of the casing 30 there is provided a pair of preheater units in the form of flat spiral coils 40 and 42. The coil 40 has its outlet connected to the cooling outlet pipe 22 while the coil 42 has its outlet connected to the lubricant outlet 26. The two coils are disposed in a parallel relation and disposed therebetween is the casing of a heater element 44. This heating element casing is preferably of a cylindrical or drum-like configuration having flat opposite faces 46 and 48 which are disposed in intimate and good heat exchange relation with the coils 40 and 42 respectively and over substantially the entire area of these coils. Any suitable heating means such as an electric heating element 50 is disposed in the heater casing 44 whereby heat is applied by the heating unit 44 to the two coils 40 and 42. The previously mentioned electric supply cable 18 is preferably connected to the coil 50 for energizing the latter.

Figure 5:
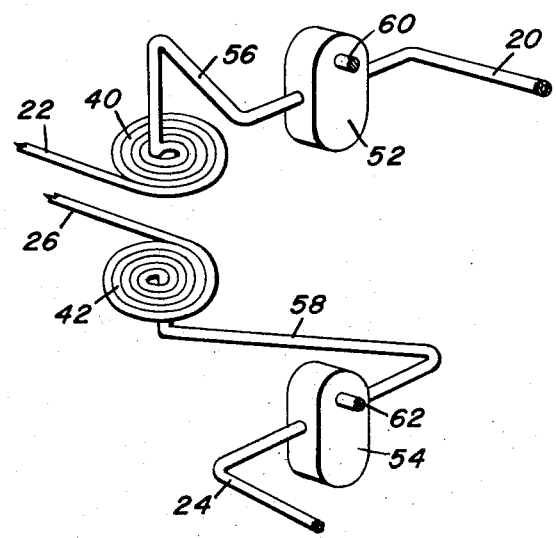
FIGURE 5 is a group perspective view of portions of the two preheater components of the device.

Disposed at a mid portion of the casing and between the electric motor 34 and the two heating coils 40 and 42 are a pair of liquid circulating pumps consisting of a coolant circulating pump 52 and a lubricant circulating pump 54. The two inlet conduits 20 and 24 respectively communicate with the intake of the pumps 52 and 54 while the outlets of these pumps are connected by connecting conduits 56 and 58 respectively to the two coils 40 and 42 at their central inlets as will be apparent from FIGURES 4 and 5.

Each of the two pumps is connected to the single source of power 34. For this purpose, driven shafts 60 and 62 of the cooling and lubricating pumps 52 and 54 are provided with driven gears 64 and 66 respectively which are engaged with opposite sides of the driving gear 38 of the source of power. Thus a single source of power serves to operate both pumps and thus effect the circulation of the coolant and lubricant through the preheater assembly.

From the foregoing, the operation of the invention will now be readily apparent. When it is desired to preheat the internal combustion engine in preparation for starting the latter, as for example in extremely cold weather or the like, the electric supply cable 18 is plugged into any suitable source of electric current. Thereupon, electric energy is supplied to the source of power 34 which through the driving means operates the two pumps 52 and 54. At the same time, electric current is supplied to the heating unit 44 thus supplying heat to the preheating water and lubricant coils 40 and 42. Consequently, as the coolant and the lubricant are heated, it is circulated through the corresponding cooling and lubricating systems of the engine thereby effectively warming all of the parts of the engine and conditioning both the engine and its working parts and the cooling and lubricating system thereof for efficient immediate operation as soon as the engine is started.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A preheater for internal combustion engines comprising a housing, an oil preheater and a water preheater disposed in said housing, means in said housing for applying heat to each of said preheaters, passage means connecting said heaters to the lubricating and cooling systems respectively of an internal combustion engine, each of said passage means including a fluid circulating pump, common drive means connected to both of said pumps.

2. The combination of claim 1 wherein said pumps are disposed in said housing.

3. The combination of claim 1 wherein both of said pumps and said common drive means are disposed in said housing.

4. The combination of claim 3 wherein said common drive means consists of an electric motor having a driving gear, and each of said pumps has a driven gear engaging said driving gear.

5. The combination of claim 1 wherein said oil and water preheaters each comprises a heating coil, said heat applying means being disposed between and being in good heat exchange relation with said coils.

6. An internal combustion engine preheater comprising an elongated housing, a source of power disposed in one end of said housing and including a drive shaft having a driving gear thereon, a pair of flat, spiral preheating coils disposed centrally in the other end of said housing, passage means connecting said coils one to an engine lubricating system and the other to an engine cooling system for by-passing liquids from said systems through said coils, each passage means including a liquid impelling pump in said housing between said coils and power source, said pumps having each a driven shaft with a driven gear thereon, said driven shafts being parallel and extending longitudinally of said housing with said driven gears engaging said driving gear on opposite sides thereof, a disk-like electrical heating unit in said housing having its opposite faces in good heat exchange relation with the adjacent faces of said coils, means mounting said housing upon the side of an internal combustion engine, means applying heat to each of said coils.

7. The combination of claim 6 wherein said coils comprise flat spirals in parallel relation, said heat applying means comprising an electrically operated heater disposed between said coils and in good heat exchange relation with each coil through the entire area of the adjacent face of said coils and heater.

8. The combination of claim 7 including a source of electric energy connected to and simultaneously energizing both said power source and to said heater.

References Cited in the file of this patent

UNITED STATES PATENTS

| | | |
|---|---|---|
| 1,562,240 | Melotti | Nov. 17, 1925 |
| 2,400,838 | Olson | May 21, 1946 |
| 2,530,457 | Freed | Nov. 21, 1950 |
| 2,712,815 | Blessing | July 12, 1955 |